(12) United States Patent
Mohamadi

(10) Patent No.: US 9,244,163 B2
(45) Date of Patent: Jan. 26, 2016

(54) INTEGRATED ULTRA WIDEBAND, WAFER SCALE, RHCP-LHCP ARRAYS

(71) Applicant: Farrokh Mohamadi, Irvine, CA (US)

(72) Inventor: Farrokh Mohamadi, Irvine, CA (US)

(73) Assignee: Farrokh Mohamadi, Irvine, CA (US)

( * ) Notice: Subject to any disclaimer, the term of this patent is extended or adjusted under 35 U.S.C. 154(b) by 308 days.

(21) Appl. No.: 13/755,947

(22) Filed: Jan. 31, 2013

(65) Prior Publication Data

US 2013/0307716 A1 Nov. 21, 2013

Related U.S. Application Data

(60) Provisional application No. 61/648,518, filed on May 17, 2012.

(51) Int. Cl.

| | |
|---|---|
| *G01S 13/88* | (2006.01) |
| *H01Q 3/28* | (2006.01) |
| *G01S 7/02* | (2006.01) |
| *G01S 13/02* | (2006.01) |
| *H01Q 9/27* | (2006.01) |
| *H01Q 21/00* | (2006.01) |
| *H01Q 21/06* | (2006.01) |

(52) U.S. Cl.
CPC ............... *G01S 13/887* (2013.01); *G01S 7/026* (2013.01); *G01S 13/0209* (2013.01); *H01Q 3/28* (2013.01); *H01Q 9/27* (2013.01); *H01Q 21/0006* (2013.01); *H01Q 21/061* (2013.01)

(58) Field of Classification Search
CPC ... G01S 13/0209; G01S 13/887; G01S 7/026; H01Q 21/061
USPC .................................................. 342/175, 22
See application file for complete search history.

(56) References Cited

U.S. PATENT DOCUMENTS

| | | | | |
|---|---|---|---|---|
| 5,936,588 | A * | 8/1999 | Rao et al. .................. | H01Q 3/24 342/372 |
| 6,396,450 | B1 * | 5/2002 | Gilbert ..................... | H01J 29/10 342/374 |
| 6,870,503 | B2 | 3/2005 | Mohamadi | |
| 6,885,344 | B2 | 4/2005 | Mohamadi | |
| 6,963,307 | B2 | 11/2005 | Mohamadi | |
| 6,982,670 | B2 | 1/2006 | Mohamadi | |
| 7,042,388 | B2 | 5/2006 | Mohamadi | |
| 7,126,541 | B2 | 10/2006 | Mohamadi | |
| 7,126,542 | B2 | 10/2006 | Mohamadi | |
| 7,126,554 | B2 | 10/2006 | Mohamadi | |
| 7,312,763 | B2 | 12/2007 | Mohamadi | |

(Continued)

*Primary Examiner* — Timothy A Brainard
(74) *Attorney, Agent, or Firm* — Haynes and Boone, LLP

(57) ABSTRACT

A system includes: a planar antenna array that includes a plurality of right-hand circularly polarized (RHCP) antennas and left-hand circularly polarized (LHCP) antennas in a planar surface or in layers, in which each antenna element includes a spiral plate; a feed network connecting a signal to each of the antennas; and amplifiers dispersed in the feed network configured to provide spatial power combining and beam forming of the signal. A method for detecting concealed objects includes: scanning with a first transmitted signal having a first polarization; receiving reflected signals from the first transmitted signal; scanning with a second transmitted signal having a second polarization different from the first polarization; receiving reflected signals from the second transmitted signal; performing image processing using reflected signals with the first polarization; performing image processing using reflected signals with the second polarization; and combining the image processing from both polarizations to provide enhanced image resolution.

19 Claims, 14 Drawing Sheets

(56) References Cited

U.S. PATENT DOCUMENTS

| | | |
|---|---|---|
| 7,321,339 B2 | 1/2008 | Mohamadi |
| 7,352,324 B2 | 4/2008 | Mohamadi |
| 7,358,848 B2 | 4/2008 | Mohamadi |
| 7,414,577 B2 | 8/2008 | Mohamadi |
| 7,423,607 B2 | 9/2008 | Mohamadi |
| 7,542,005 B2 | 6/2009 | Mohamadi |
| 7,548,205 B2 | 6/2009 | Mohamadi |
| 7,554,504 B2 | 6/2009 | Mohamadi |
| 7,610,064 B2 | 10/2009 | Mohamadi |
| 7,683,852 B2 | 3/2010 | Mohamadi |
| 7,697,958 B2 | 4/2010 | Mohamadi |
| 7,728,784 B2 | 6/2010 | Mohamadi |
| 7,742,000 B2 | 6/2010 | Mohamadi |
| 7,791,556 B2 | 9/2010 | Mohamadi |
| 7,830,989 B2 | 11/2010 | Mohamadi |
| 7,839,283 B2 | 11/2010 | Mohamadi |
| 7,843,992 B2 | 11/2010 | Mohamadi |
| 7,855,695 B2 | 12/2010 | Mohamadi |
| 7,884,757 B2 | 2/2011 | Mohamadi et al. |
| 7,884,776 B2 | 2/2011 | Mohamadi |
| 7,884,777 B2 | 2/2011 | Izadpanah et al. |
| 8,098,189 B1 * | 1/2012 | Woodell et al. ............ 342/26 R |
| 8,154,339 B2 | 4/2012 | Zohlgadri et al. |
| 2003/0122715 A1 * | 7/2003 | Aikawa et al. ......... 343/700 MS |
| 2009/0224964 A1 * | 9/2009 | Raney .................... G01S 7/026 342/25 F |
| 2010/0225520 A1 | 9/2010 | Mohamadi et al. |
| 2010/0327970 A1 | 12/2010 | Mohamadi |
| 2011/0090133 A1 | 4/2011 | Mohamadi |
| 2012/0001674 A1 | 1/2012 | Mohamadi et al. |

* cited by examiner

Position of the Gun

Concealed Gun Beneath Clothing

US 9,244,163 B2

INTEGRATED ULTRA WIDEBAND, WAFER SCALE, RHCP-LHCP ARRAYS

CROSS REFERENCE TO RELATED APPLICATIONS

This application claims the benefit of priority from U.S. Provisional Patent Application No. 61/648,518, filed May 17, 2012, which is incorporated by reference.

BACKGROUND

Embodiments of the present invention generally relate to radar imaging systems and, more particularly, to wafer scale, right hand circularly polarized (RHCP) and left hand circularly polarized (LHCP) antenna arrays integrated with ultra wideband radar systems.

An important security issue for protection of individuals in public places—such as airports, schools, and government facilities, for example—is detection of hidden objects, e.g., objects such as weapons or improvised explosive devices (IED) that may be carried by a person and concealed, for example, underneath or within clothing or in luggage or other hand-carried items. X-ray technology has been used, for example, for airport screening but presents a number of issues, such as cumulative over exposure to radiation for airport and airline personnel and concerns over personal privacy, that have led to a search for other technologies and methods for addressing these security issues.

Figure 1:
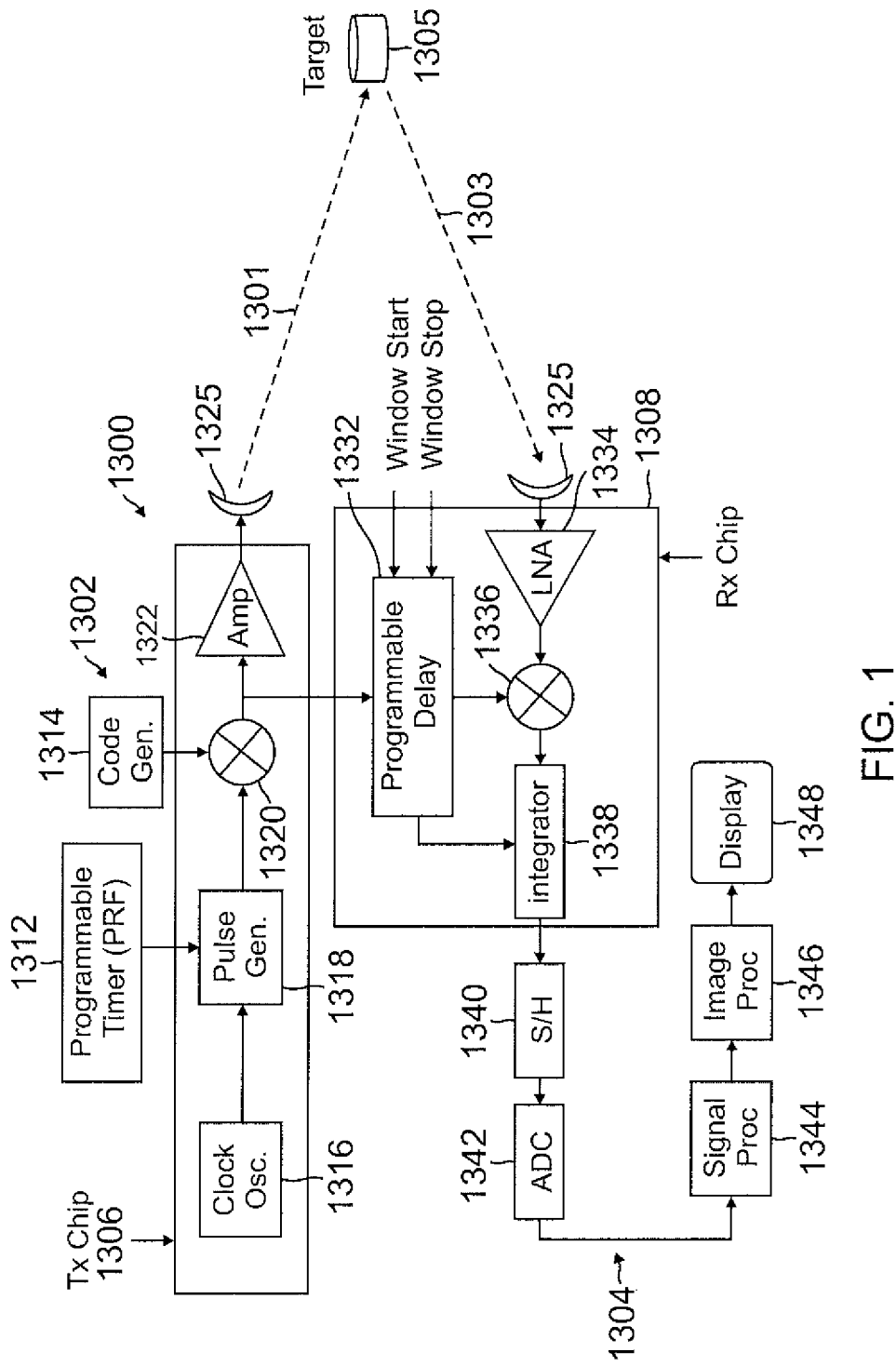
FIG. 1 is a system block diagram illustrating a radar sensor and imaging system in accordance with one or more embodiments of the present disclosure.

Embodiments of the present disclosure and their advantages are best understood by referring to the detailed description that follows. It should be appreciated that like reference numerals are used to identify like elements illustrated in one or more of the figures, in which the showings therein are for purposes of illustrating the embodiments and not for purposes of limiting them.

DETAILED DESCRIPTION

Broadly speaking, methods and systems are provided in one or more embodiments for detecting concealed weapons and other contraband using small, compact, and portable ultra wideband (UWB) radar sensing and imaging systems that employ wafer scale (e.g., less than 4.0 inches in side dimension for the antenna array) active array antennas. Such small scale UWB radar sensing and imaging systems can find application to many types of security concerns, such as screening people for concealed weapons (including non-metallic weapons) or explosives at airports and other public buildings.

One or more embodiments may include implementation of a transmitter (TX) fully integrated with an array of power amplifiers (PA) and corresponding antenna arrays to form spatial power combining and beam forming. One or more embodiments may include implementation of a receiver (RX) fully integrated with an array of low noise amplifiers (LNA) and corresponding antenna arrays to form spatial power combining from a reflected signal. One or more embodiments may include implementation of an active antenna array (e.g., antenna-amplifier array) including a fully integrated feed network with associated power amplifiers that transmit (or low noise amplifiers to receive) a radar signal in X-band (e.g., about 8-12 giga-Hertz (GHz)), V-band (e.g., about 40-75 giga-Hertz (GHz)), E-band (e.g., including two bands of about 71-76 and 81-86 GHz), W-band (e.g., about 75-110 GHz), or terahertz (e.g., about 300-3000 GHz) frequency bands. One or more embodiments may include integrated ultra wideband, wafer scale, right hand circularly polarized (RHCP) antenna elements, using an innovative spiral plate, for beam forming and beam steering. One or more embodiments may include integrated ultra wideband, wafer scale, left hand circularly polarized (LHCP) using an innovative spiral plate, antenna elements for beam forming and beam steering. In one or more embodiments, the unique design provides ultra wideband, wafer scale, RHCP and LHCP antenna arrays in which side lobes are at least 20 decibels (dB) suppressed. In one or more embodiments, the unique design provides ultra wideband, wafer scale, RHCP and LHCP antenna arrays in which cross polarization is at least 20 dB suppressed. One or more embodiments provide the capability to modify the cross polarization and array gain, and tune the antenna array for optimum insertion loss by controlling spiral design variables. One or more embodiments provide the capability to modify the feed network to tune the antenna array for optimum insertion loss. One or more embodiments may include integration of the wafer scale RHCP layer antenna array with another layer of LHCP array on top (or bottom). In one or more embodiments, integrated RHCP and LHCP layers operate as a wafer scale antenna module that can transmit through the LHCP array and receive waves in the LHCP array as well as the RHCP array. In one or more embodiments, integrated RHCP and LHCP layers perform as a wafer scale antenna module that can transmit through the RHCP array and receive waves in the LHCP array as well as the RHCP array.

One or more embodiments may include improvement in a typical size, weight, and power (SWAP) metric of an order of magnitude for the wafer scale, active array compared to a more conventional dish reflector approach. For example, in one or more embodiments the size of a single transmitter-receiver unit (e.g., front board or rear board as described below) may be less than 4.0 inches by 4.0 inches for a transmitter-receiver unit operating at 95 GHz and 6.3 inches by 6.3 inches for a transmitter-receiver unit operating at 83 GHz; weight of either transmitter-receiver unit may be no more than 7.0 pounds; and DC (direct current) power consumed for each integrated module (e.g. the sensor system including transmitter-receiver units) may be less than 180 Watts (W).

In one or more embodiments, a system may include: a planar antenna array that includes a plurality of right-hand circularly polarized (RHCP) antennas and left-hand circularly polarized (LHCP) antennas in a planar surface or in layers, wherein each antenna element includes a spiral plate; a feed network connecting a signal to each of the antennas; and a plurality of amplifiers dispersed in the feed network and configured to provide spatial power combining and beam forming of the signal. In one or more embodiments, a method for detecting concealed objects may include: scanning with a first transmitted signal having a first polarization; receiving reflected signals from the first transmitted signal; scanning with a second transmitted signal having a second polarization different from the first polarization; receiving reflected signals from the second transmitted signal; performing image processing using reflected signals with the first polarization; performing image processing using reflected signals with the second polarization; and combining the image processing from both polarizations to provide enhanced image resolution.

FIG. 1 illustrates a radar sensor and imaging system 1300 in accordance with one embodiment. Radar system 1300 may include an impulse radar transmitter 1302 that transmits narrow radio frequency (RF) pulses at a certain pulse repetition frequency (PRF). For example, the transmitter of radar system 1300 may emit RF radiation 1301 in the form of rapid wideband (narrow width) radar pulses at a chosen pulse repetition frequency (PRF) in the 1-10 GHz band. The pulses can penetrate, for example, soil, glass, wood, concrete, dry wall, and bricks with varying attenuation constant. By choosing a PRF in the range of 10-100 MHz, for example, and appropriate average transmitter power, a surveillance range of approximately 5-50 feet can generally be achieved. The radar system 1300 may, for example, transmit Gaussian pulses as short as 100 pico-seconds wide with center frequency in the 1-10 GHz band. Transmitter 1302 may employ a wafer scale antenna and wafer scale beam forming as disclosed in U.S. Pat. No. 7,312,763, issued Dec. 25, 2007, to Mohamadi and U.S. Pat. No. 7,548,205, issued Jun. 16, 2009, to Mohamadi and virtual beam forming as disclosed in U.S. Pat. No. 8,237,604, issued Aug. 7, 2012, to Mohamadi et al., all of which are incorporated by reference. Wafer scale antenna modules (WSAM) are disclosed by U.S. Pat. No. 7,884,757, issued Feb. 8, 2011, to Mohamadi et al. and U.S. Pat. No. 7,830,989, issued Nov. 9, 2010 to Mohamadi, both of which are incorporated by reference. Depending on a particular application of a system, such as walk-through security screening, mechanical movement and steering of the beam may also be employed as disclosed in U.S. Pat. No. 7,697,958, issued Apr. 13, 2010 to Mohamadi, which is also incorporated by reference.

Radar system 1300 may include a radar receiver 1304 that performs the required signal processing on a reflected response (e.g., reflected pulses 1303) to construct a digitized representation of the target 1305 (e.g., a buried IED). In the receiver 1304, amplitude and delay information may be extracted and digitally processed. As shown in FIG. 1, many of the transmitter 1302 functions may be implemented on a transmitter chip 1306 and many of the receiver 1304 functions may be implemented on a receiver chip 1308.

A general block diagram of transmit and receive functions are depicted in FIG. 1. As shown in FIG. 1, radar system 1300 may include modules for performing the functions, including: programmable timer 1312 for establishing the PRF; code generator 1314 for providing modulations to the signal 1301; clock oscillator 1316 for providing the RF carrier frequency signal; pulse generator 1318 for forming (or generating) narrow radar pulses based on timing from programmable timer 1312; multiplier 1320 for combining the generated radar pulses with the output of code generator 1314; power amplifier 1322 for amplifying the pulse signal and feeding it to antenna 1325, which may be a wafer scale, beam forming antenna as described above. Although two antennas 1325 are shown in FIG. 1 for clarity of illustration, use of a circulator (not shown) as an isolator switch may enable use of a single antenna 1325 for both transmit and receive. Antenna 1325 may include an active array antenna implemented using wafer scale antenna module technology.

Radar system 1300, as shown in FIG. 1, may further include modules for performing functions, including: programmable delay timer 1332, coordinated with the transmitted signal 1301, as indicated by the arrow between transmitter chip 1306 and receiver chip 1308, for providing timing, e.g., window start and window stop, for receiving reflected pulses 1303; a low noise amplifier 1334 for receiving the reflected pulses 1303; multiplier 1336 for combining the received reflected pulses 1303 and the window delay from programmable delay timer 1332; integrator 1338; sample and hold 1340, analog to digital converter 1342; signal processor 1344 (e.g., a digital signal processor or DSP); image processor 1346; and display 1348. Display 1348 may be, for example, an LCD (liquid crystal display) display.

Figure 2:
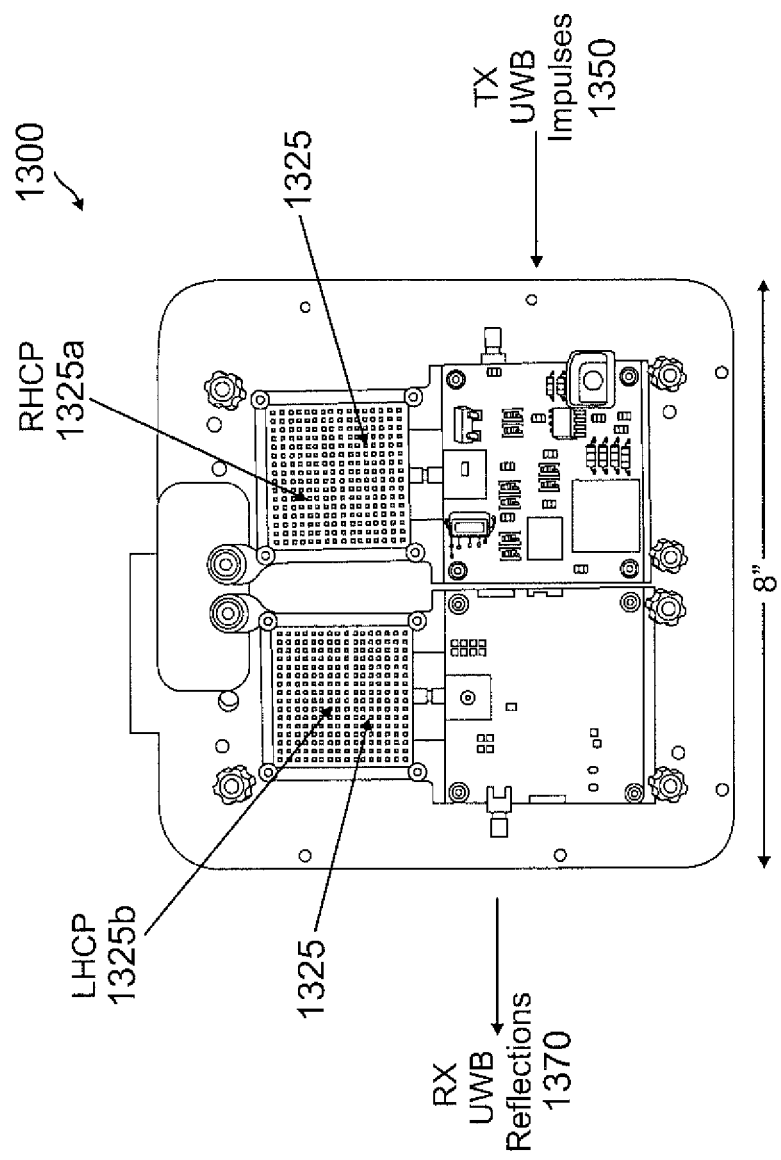
FIG. 2 is a perspective view illustrating an example of a physical layout for part of a radar system, in accordance with an embodiment.

FIG. 2 illustrates an example of a physical layout for part of a radar system, in accordance with an embodiment. FIG. 2 shows an example of left-hand circularly polarized (LHCP) and right-hand circularly polarized (RHCP) 16-by-16 element antenna arrays 1325 for a radar system 1300. Although two antenna arrays 1325 are shown in FIG. 2, use of a circulator (not shown) as an isolator switch may enable use of a single antenna 1325 for both transmit and receive. In one embodiment, the transmit array 1325a and the receive array 1325b may be separately implemented as shown in FIG. 2.

Figure 9:
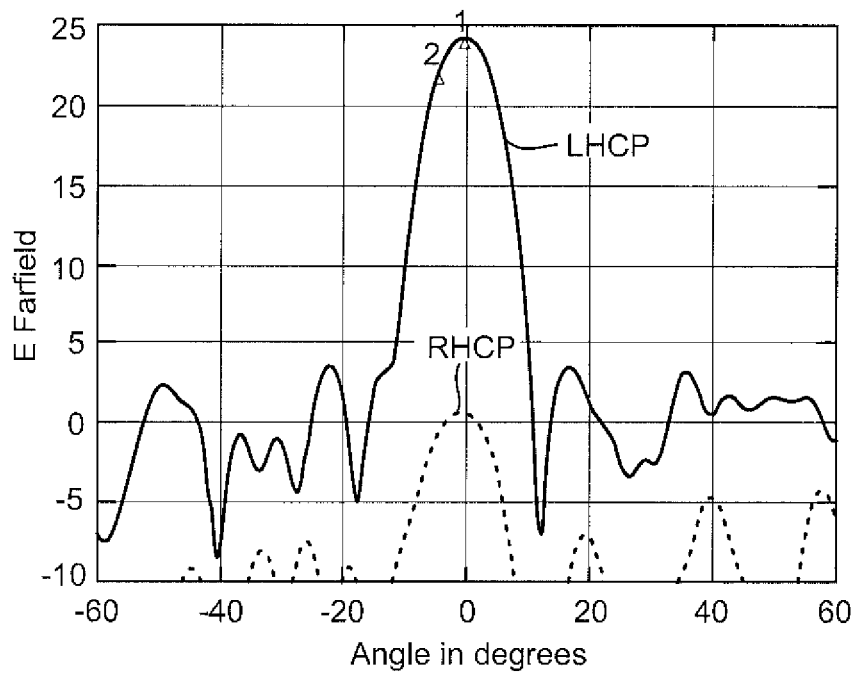
FIG. 9 is a graph showing an example of polarization and enhancement of side lobe suppression for a four-by-four element collimated antenna array, in accordance with an embodiment.

Each active antenna array 1325 (LHCP and RHCP) may be implemented in a planar surface to provide higher signal resolution and phase contrast with minimal thickness of the arrays. LHCP and RHCP planar active array antennas 1325 may provide improved suppression of side lobes (e.g. achieving 20 dB suppression as seen in FIG. 9, for example) and may address a critical factor for clear radar imaging as a result of antennas with high contrast efficiency (e.g., greater than 95%). As seen in FIG. 2, overall side dimension of a sensor unit with two antenna arrays may be no greater than 8 inches; thus, the side dimension of each planar active antenna array 1325 may be less than 4.0 inches. With formation of the beam occurring in the spatial combining and power amplifier and low noise amplifiers, and use of LHCP and RHCP arrays cross coupling of a high power TX to RX input may be practically eliminated (e.g., greater than 20 dB suppression). As a result, a high gain (42 dBi) array 1325 can be used with 4.0 inch per side dimensions (as seen in FIG. 2) that can be placed in a 6.0 inch (or less) diameter substrate. Due to the dual use of antenna arrays 1325a and 1325b as combiner as well as beam former, the antenna module size can be substantially smaller, lighter, and easier to install than conventional radar sensors, especially for operation at the W-band.

Figure 3:
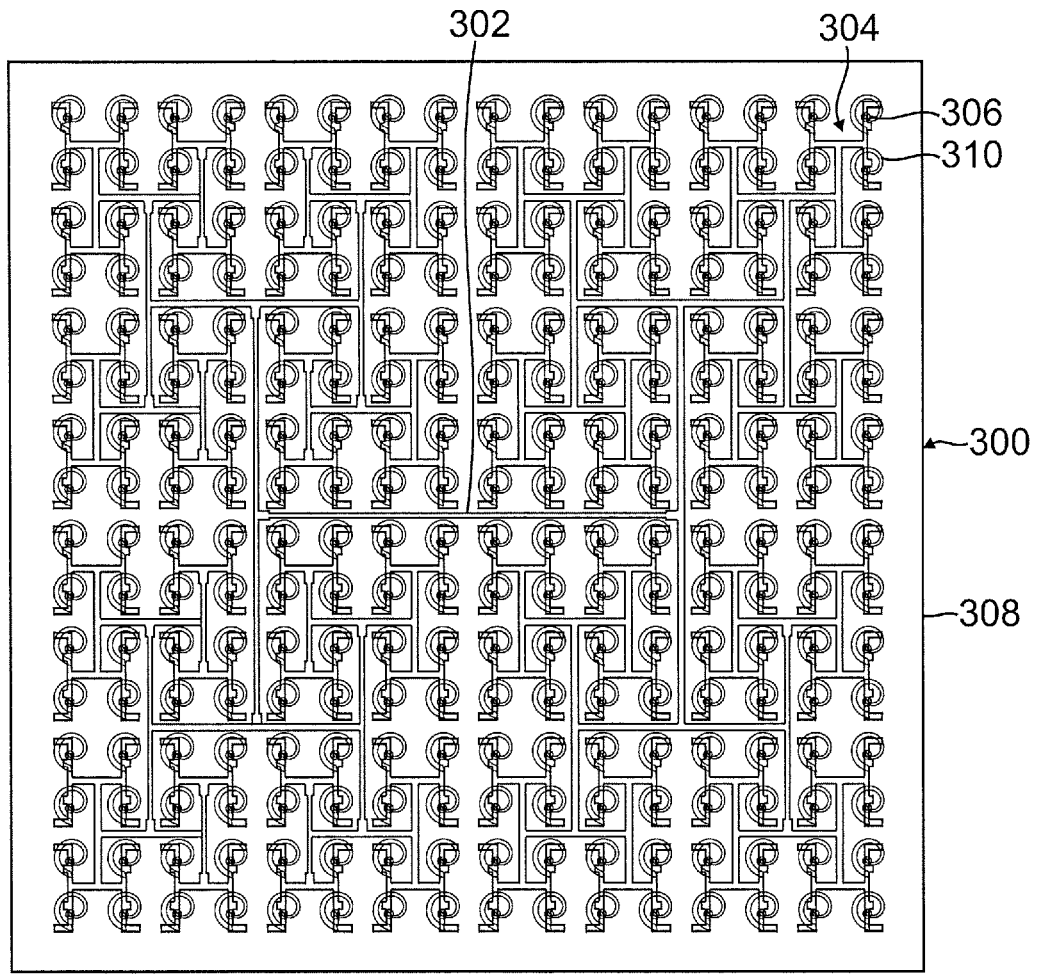
FIG. 3 is a plan view diagram showing antenna element and feed network layout for a wafer scale antenna array, in accordance with an embodiment.

FIG. 3 is an illustration of a wafer scale antenna array 300 showing antenna element and feed network layout for a 16-by-16 antenna element array 300, in accordance with an embodiment. Wafer scale antenna array 300 may be used, for example, to identify the phase of an object, in case that the array is used as part of a radar transmitter and receiver. In a fully integrated wafer-scale system, the array may be fed from the center as seen in FIG. 3 showing a central array feed 302. Wafer scale antenna array 300 may include an H-tree feed network 304, vias 306, ground plane shield 308, and UWB spiral antenna plates 310 as a 16-by-16 wafer-scale LHCP array.

Figure 4:
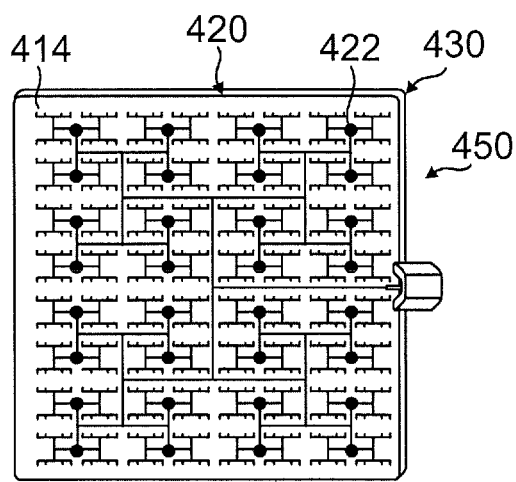
FIG. 4 is a schematic diagram showing an example of power or low noise amplifier placement for an antenna array, in accordance with an embodiment.
Figure 5A:
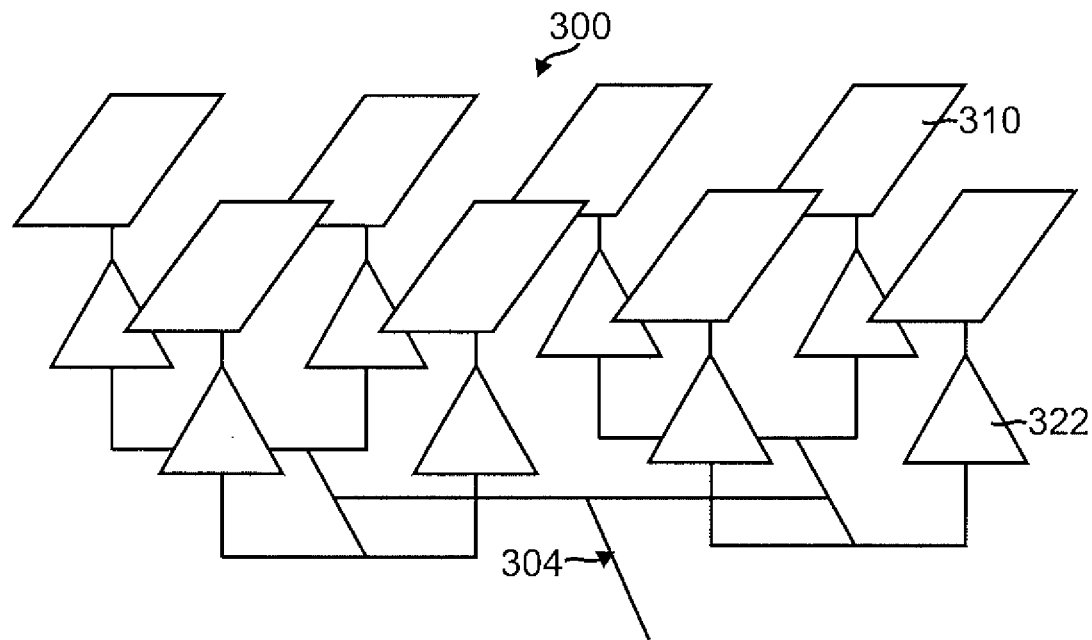
FIGS. 5A and 5B are schematic diagrams showing different examples of power amplifier placement in a feed network for an antenna array, in accordance with an embodiment.
Figure 5B:
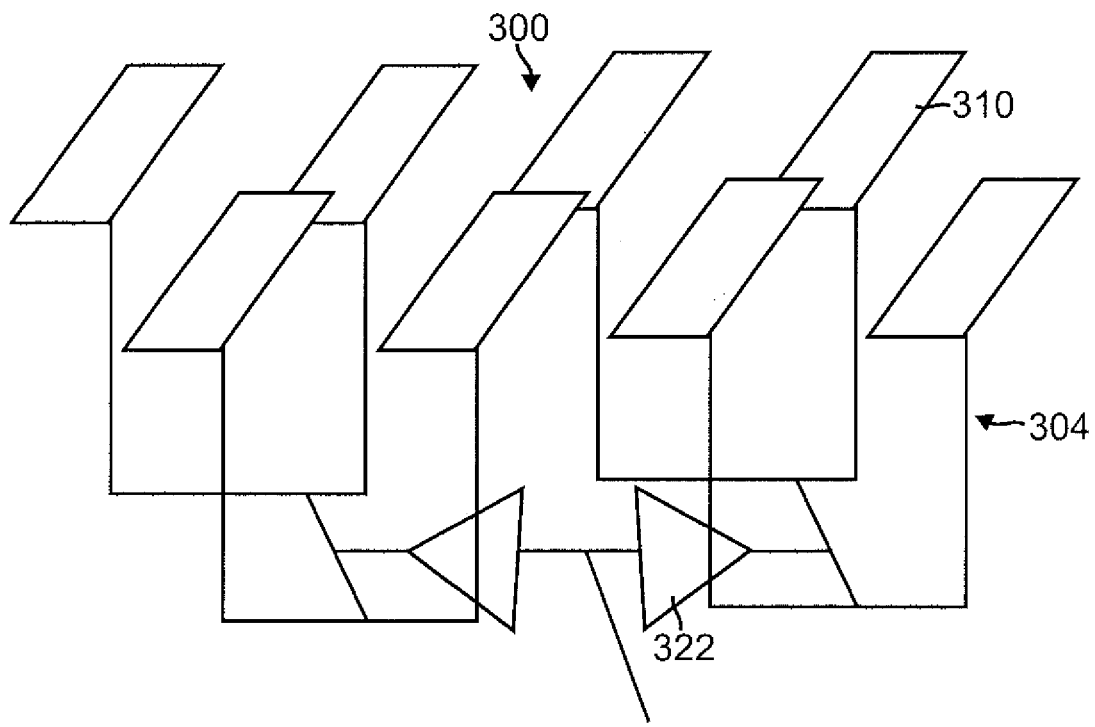

FIG. 4 shows an example of power amplifier or low noise amplifier placement for an antenna array, such as arrays 1325, 1325a, 1325b, or 300. FIG. 4 shows a 16-by-16 antenna array 420, with 16 power amplifiers 422—which may be implemented in Gallium-Nitride (GaN), for example—feeding 256 antenna elements 414. In a similar example, the 16-by-16 antenna array 420 may be implemented in Gallium-Arsenide (GaAs) with 64 power amplifiers 422 (placed differently as illustrated by the example of FIGS. 5A and 5B) feeding the 256 antenna elements 414. Array 420 may be referred to as a "tile". The spatial combiner of each tile may be manufactured using an H-tree technique of the planar active array, as seen in FIGS. 3 and 4. Planar antenna array 420 may be disposed "on top of" another similar array 430 having either the same or orthogonal polarization so that arrays 420 and 430 are layered. Thus, a wafer scale antenna module 450 may include integration of the wafer scale RHCP layer antenna array 430 with another layer of LHCP array 420 on top (or bottom). In one or more embodiments, integrated RHCP and LHCP layers 420, 430 may operate as a wafer scale antenna module 450 that can transmit through the LHCP array and receive waves in the LHCP array as well as the RHCP array, and, conversely, the integrated RHCP and LHCP layers may perform as a wafer scale antenna module 450 that can transmit through the RHCP array and receive waves in the LHCP array as well as the RHCP array.

FIGS. 5A and 5B show an example of power amplifier placement variation for a feed network for an antenna array 300, which may provide flexibility to adjust for differing power and thermal requirements of various materials (e.g., Si, SiGe, GaN, GaAs, and InP) used to implement array 300. For example, optimal dispersion of power amplifiers 322 in feed network 304 for feeding antenna elements (e.g., spiral antenna plates 310) may differ from providing one power (or low noise in the case of a receiving antenna array) amplifier 322 per antenna element, as shown in FIG. 5A, to providing one power (or low noise in the case of a receiving antenna array) amplifier 322 per several antenna elements, for example, four, as shown in FIG. 5B.

Figure 6B:
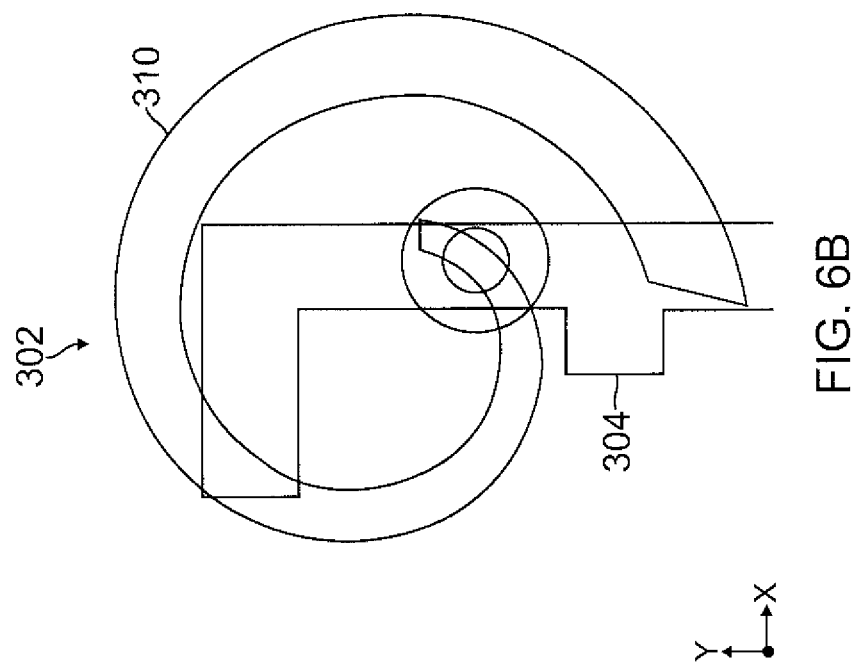
FIGS. 6A and 6B are plan view diagrams illustrating unit cells of an antenna array for left hand circularly polarized (LHCP) and right hand circularly polarized (RHCP) performance, in accordance with an embodiment.
Figure 6A:
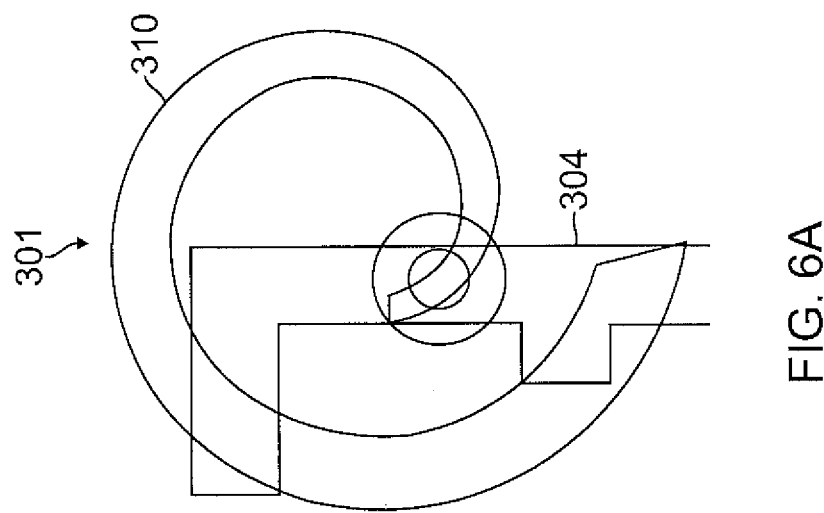

FIGS. 6A and 6B illustrate unit cells 301, 302 of an antenna array (e.g., wafer scale antenna array 300) for left hand circularly polarized (LHCP) and right hand circularly polarized (RHCP) performance. The form and dimensions of each spiral plate 310 may be defined or determined using the following equations.

Outer spiral circumference may be defined by Equations (1) and (2):

$$Xo = Ao * d * \cos(Bo + ba) + \text{off} + Cox \qquad (1)$$

$$Yo = Ao * d * \sin(Bo + ba) + \text{off} + Coy \qquad (2)$$

For 95 GHz operation, for example, the following values may be used:

Ao=5 to 101
Bo=0.08 to 1.76
ba=6.2
d=4.5
off=0
Cox=109
Coy=189

Inner spiral circumference may be defined by Equations (3) and (4):

$$Xi = Ai * d1 * \cos(Bi + ba) + \text{off} + Cix \qquad (3)$$

$$Yi = Ai * d1 * \sin(Bi + ba) + \text{off} + Ciy \qquad (4)$$

For 95 GHz operation, for example, the following values may be used:

Ai=5 to 101
Bi=0.08 to 1.76
ba=6.2
d1=6.0
off=0
Cix=109
Ciy=189

Figure 7:
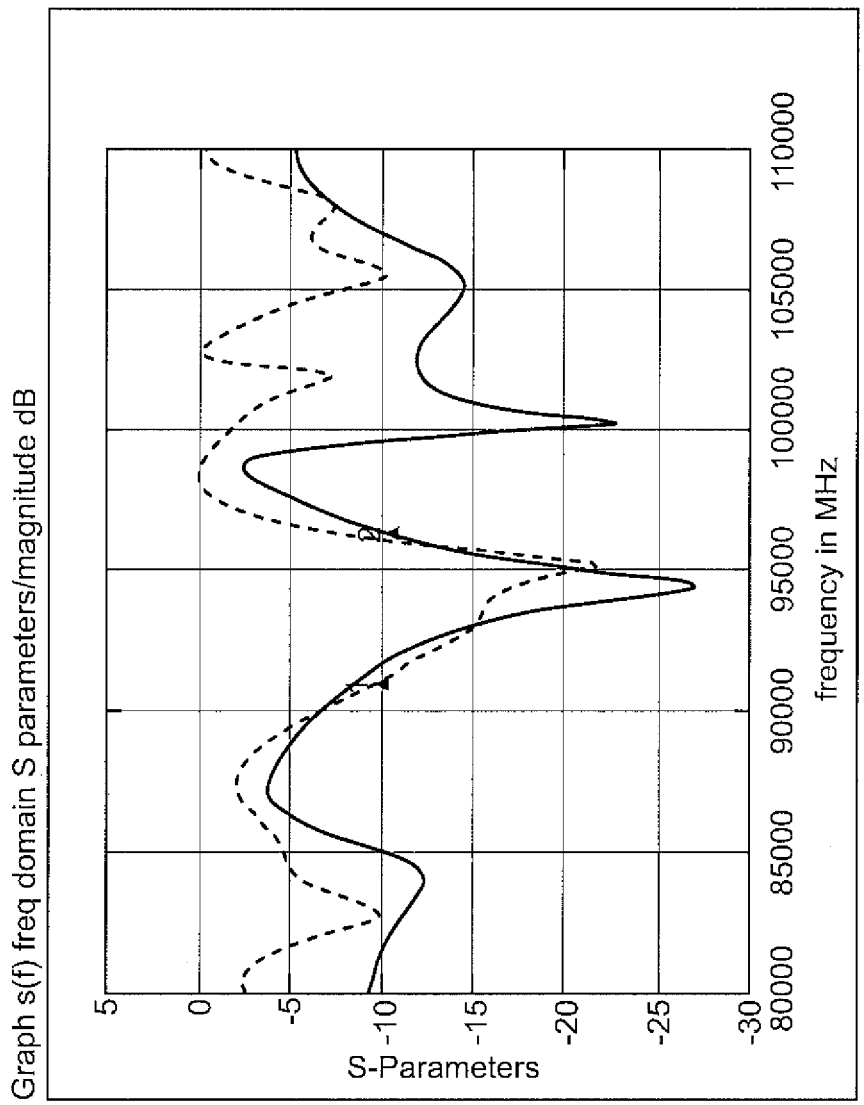
FIG. 7 is a graph illustrating insertion loss vs. frequency for a 16-by-16 LHCP antenna array, such as that shown in FIG. 3, in accordance with an embodiment.

FIG. 7 shows a graph of insertion loss (in dB) vs. frequency (in MHz) using S-parameters (e.g., a mathematical construct that quantifies how RF energy propagates through a multiport network; for example, S11 may refer to the ratio of signal that reflects from port one for a signal incident on port one) for a 16-by-16 LHCP antenna array (e.g., wafer scale antenna array 300) which operates around a center frequency of 95 GHz.

Figure 8A:
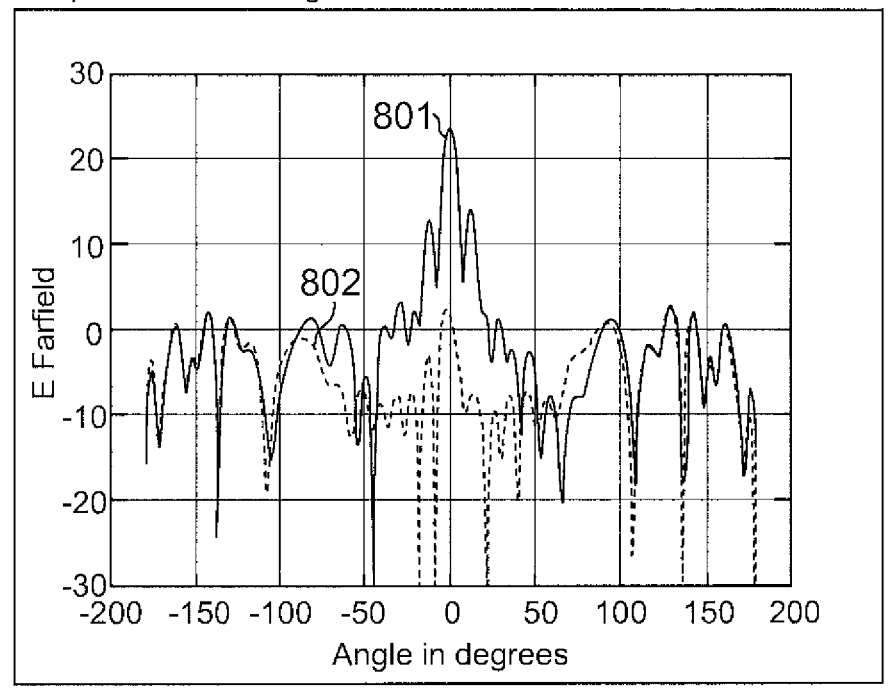
FIGS. 8A and 8B are graphs showing co-polarization and cross polarization for wafer scale, LHCP and RHCP antenna arrays, in accordance with an embodiment.
Figure 8B:
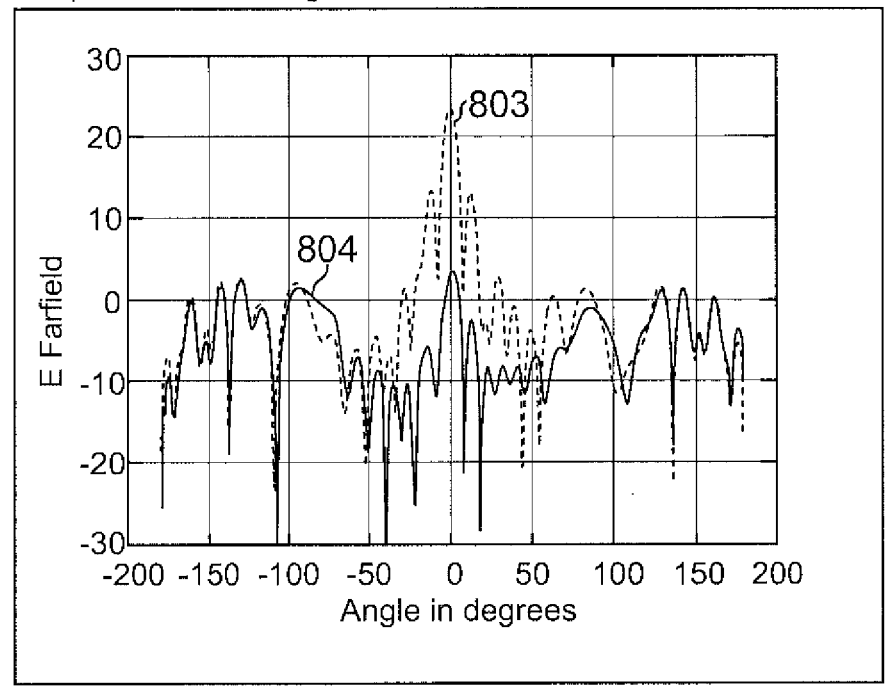

FIGS. 8A and 8B show co-polarization and cross polarization graphs for wafer scale, LHCP and RHCP antenna arrays (e.g., similar to wafer scale antenna array 300). FIG. 8A shows wafer scale beam forming of an LHCP array with left-hand circular polarization (co-polarization) beam 801 and cross polarization 802. As can be seen from the graph, beam width of better than 4 degrees can be obtained, with a 22 dB gain difference for cross polarization suppression of the RHCP wave 802.

FIG. 8B shows similar results for wafer scale beam forming of an RHCP array (e.g., similar to wafer scale antenna array 300) with right-hand circular polarization (co-polarization) beam 803 and cross polarization (LHCP) 804.

FIG. 9 shows a graph of an example of polarization and enhancement of side lobe suppression for a 4-by-4 element collimated antenna array. In one embodiment, an "out-of-phase squeezing" of the transmitted waves permits a smaller array to deliver similar gain, beam width, and polarization properties with substantially reduced number of array elements compared to a larger array such as the (256-element) antenna array 300 and may reduce the need for integration of complex power amplifiers with the antenna array, reducing the integration level, power consumption, and cost. In one embodiment, the enhancement using "out-of-phase squeezing" may permit using a 4-by-4 element (16 antenna elements) or 8-by-8 elements (64 antenna element) array instead of, for example, the implementation of the 16-by-16 (256 antenna elements) antenna array 300 such as shown in FIG. 3. Such an antenna size reduction confers the capability to reduce various radar system sizes by a factor of 4 as well as packing alternating right-hand circularly polarized (RHCP) and left-hand circularly polarized (LHCP) 4-by-4 arrays in a planar surface to provide higher radar image resolution and phase contrast with minimal thickness of the arrays.

In addition, use of a separate wafer scale collimator layer 1100 (see FIG. 10B) that is separated from the antenna array by a certain distance may be implemented. Such a collimator may be implemented as a 4-by-4 array of Teflon based (e.g., $\epsilon_r$=2.0, where $\epsilon_r$ is the relative permittivity of the material as opposed to the vacuum permittivity $\epsilon_0$) collimators that produce a beam width of approximately 8.0 degrees and a gain of 24.4 dB with 24 dB cross polarization. The index of refraction (or permittivity) of the collimators can vary among various embodiments.

Figure 10A:
FIG. 10A is a diagram showing a cross section of a collimator for an antenna array, in accordance with an embodiment.
Figure 10B:
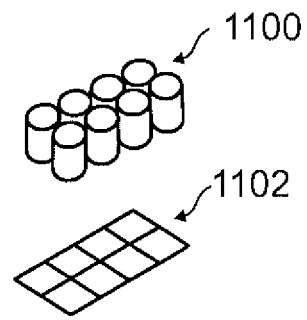
FIG. 10B is a perspective diagram of a collimator and a pair of two-by-two element collimated antenna arrays, in accordance with an embodiment.

The graph in FIG. 9 shows co-polarization and cross-polarization of the LHCP radiation and RHCP radiation of the 4-by-4 array 1102 with Teflon wafer-scale collimator 1100 shown in FIG. 10B. The size of the 4-by-4 array 1102 operating at 95 GHz may be about 5.6 mm by 5.6 mm. FIG. 9 shows side lobes are below 3 dB with a better than 20 dB side lobe suppression compared to the 16-by-16 array 300 that has two strong side lobes at 12 dB. Suppression of side lobes may be a critical factor for clear radar imaging with high contrast and high antenna efficiency (e.g., greater than 95%).

FIG. 10A is a diagram showing a cross section of a collimator for an antenna array such as shown in FIG. 10B; and FIG. 1013 is a perspective diagram of a collimator layer and a pair of 4-by-4 element collimated antenna arrays, in accordance with an embodiment. FIG. 10B depicts the implemented collimator 1100 at the position, relative to array 1102, of enhancing the gain and reducing side lobes. As shown in FIG. 10B, one 2-by-2 LHCP array and one 2-by-2 RHCP array may be integrated in the same substrate side by side. Spacing between the collimator 1100 and the array plates 1102 may be about 20 mm for a combination of collimator patterns with each protrusion upward and inward with effective radius of 20 mm and total thickness of 5 mm. Four double-sided protrusions may be placed atop of each 2-by-2 sub-array.

Figure 11A:
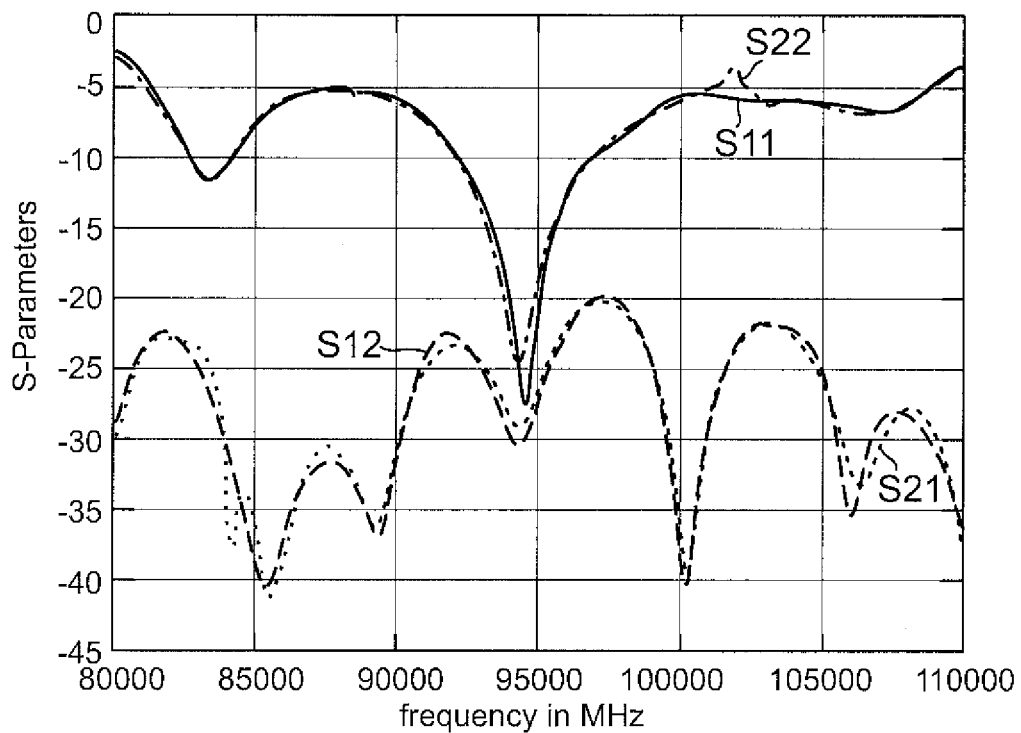
FIGS. 11A and 11B are graphs illustrating an example of cross-coupling and cross-polarization for a pair of four-by-four element antenna arrays, in accordance with an embodiment.
Figure 11B:
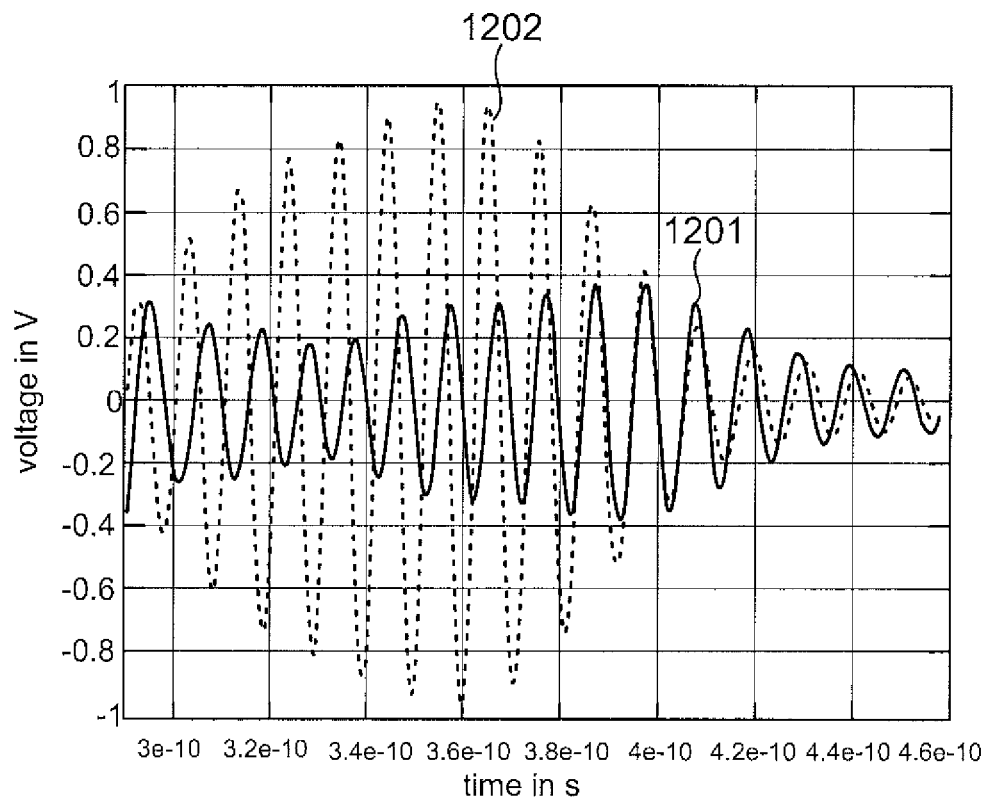

FIGS. 11A and 11B are graphs illustrating an example of cross-coupling and cross-polarization for a pair of 4-by-4 element antenna arrays, in accordance with an embodiment.

To verify lack of cross coupling, the S11, S12, S22, and S21 S-parameters, as shown in FIG. 11A, were measured.

FIG. 11B shows a graph of voltage 1201 cross coupled during transmission and then returned, in response to a modulated UWB Gaussian pulse 1202, from a metallic reflector placed 53 mm away from the (co-polarized) array 1102 for simulation purposes, illustrating that the returned voltage 1201 from the metallic reflector is highly detected by the cross-polarized array 1102.

Such simulation results, summarized in Table 1, may show, for example, that a 4-by-4 element array may have nearly the same gain, superior side lobe suppression, and enhanced cross polarization suppression, while its size is about 25% of an 8-by-8 array and 6% of a 16-by-16 array.

TABLE 1

| | System | |
| --- | --- | --- |
| | 16 × 16 | 4 × 4 with Collimator |
| Center Frequency (GHz) | 95 | 95 |
| Badwidth (GHz) | 4 | 4 |
| Beamwidth (o) | 4 | 8 |
| Antenna Gain (dB) | 26 | 24 |
| Sidelobe (dB) | 13 | 3 |
| Cross-Polarization Supression (dB) | 22 | 24 |
| Dimensions (L mm × W mm) | 22.4 × 22.4 | 5.6 × 5.6 |

Figure 12B:
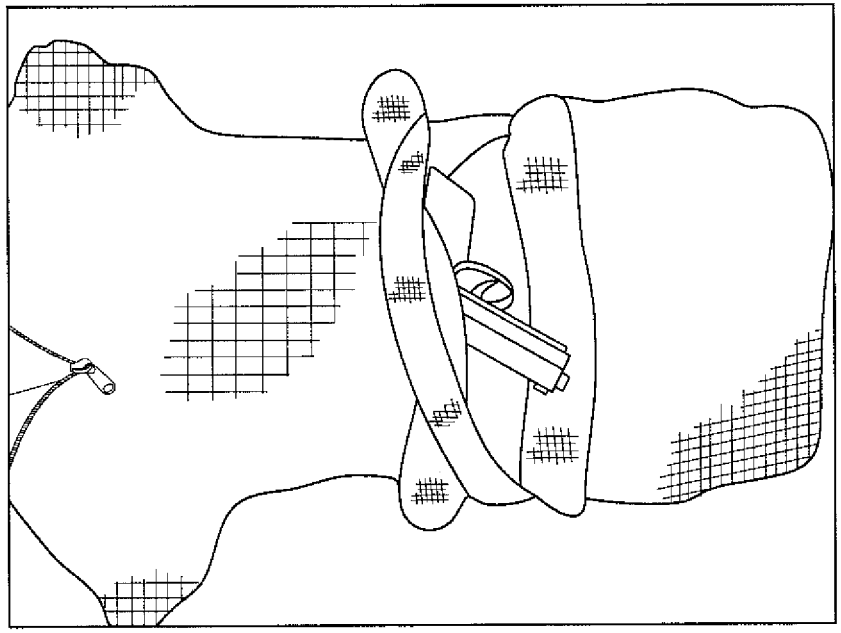
FIGS. 12A and 12B are perspective views showing a radar system test setup for a simulated person carrying a concealed (FIG. 12A) weapon shown in FIG. 12B, in accordance with an embodiment.
Figure 12A:
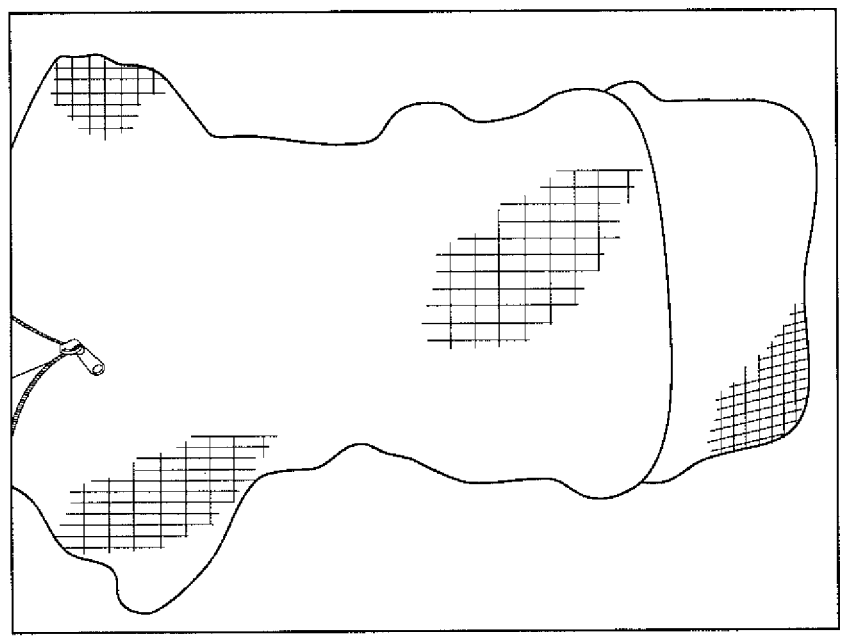

FIGS. 12A and 12B are perspective views showing a radar system test setup for a simulated person carrying a concealed weapon (FIG. 12A). FIG. 12B shows the weapon for reference comparison. In one test, the simulated person comprised water for similarity to human tissue in contrast to the metallic or non-metallic weapon. In another test, the simulated person comprised a mannequin sprayed with a paint that contained metal particles such that the paint can implement reflections from the fat of a human body.

Figures 13A, 13B:
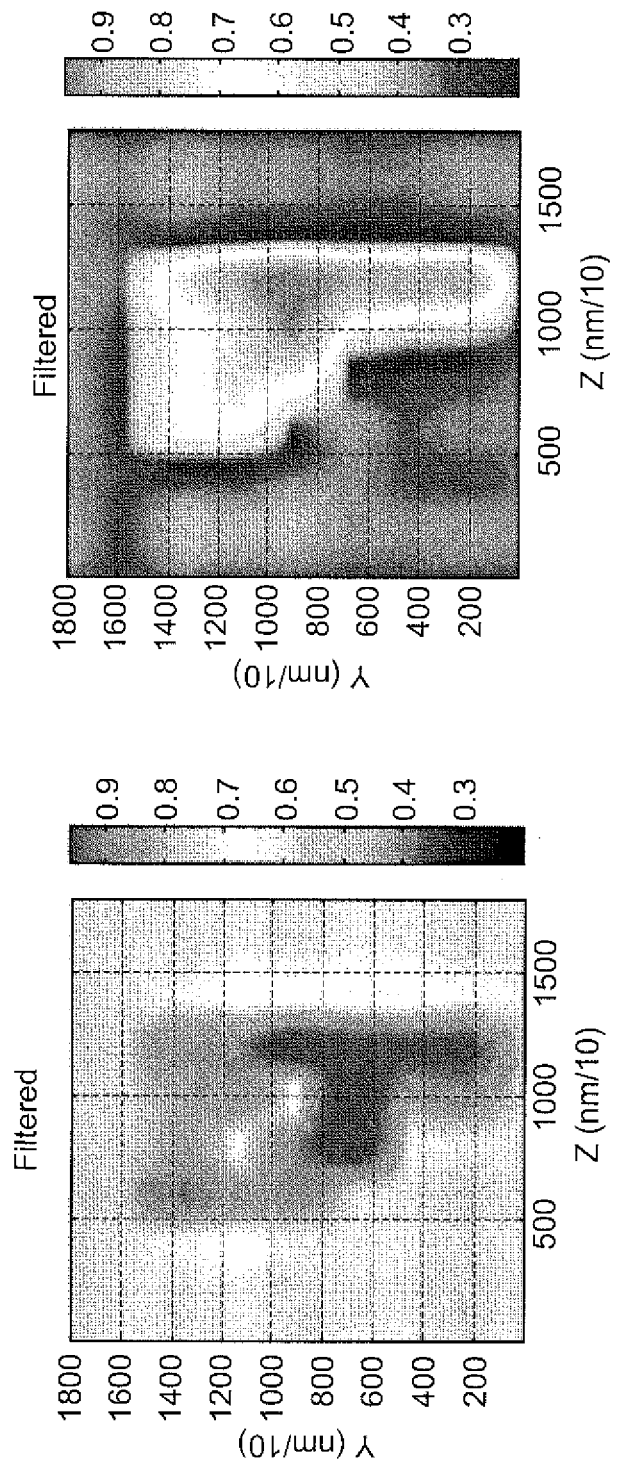
FIGS. 13A and 13B are images of a weapon, such as shown in FIGS. 12A and 12B, produced by a radar system without polarization, in accordance with an embodiment.

FIGS. 13A and 13B are images of a weapon, such as illustrated by FIGS. 12A and 12B, produced by a radar system without polarization, in accordance with an embodiment. The weapon used for simulation was a small, 11 centimeter (cm) by 7 cm, pistol with the following simulation parameters: Intrusive Shaped: Copper Cap; Conductivity=infinite, skin effect 10 μm; Body material: Water, Rel. Permittivity=89, Tangent Delta=0.157; Antenna: beam width 2 cm×2 cm (4 lambda×4 lambda); Angular beam width: at 2 ft. in air=2.0 degrees. FIG. 13A shows the image resulting from using 27.5 GHz scan frequency with no polarization. FIG. 13B shows the image resulting from using 60 GHz scan frequency with no polarization.

Figures 14A, 14B:
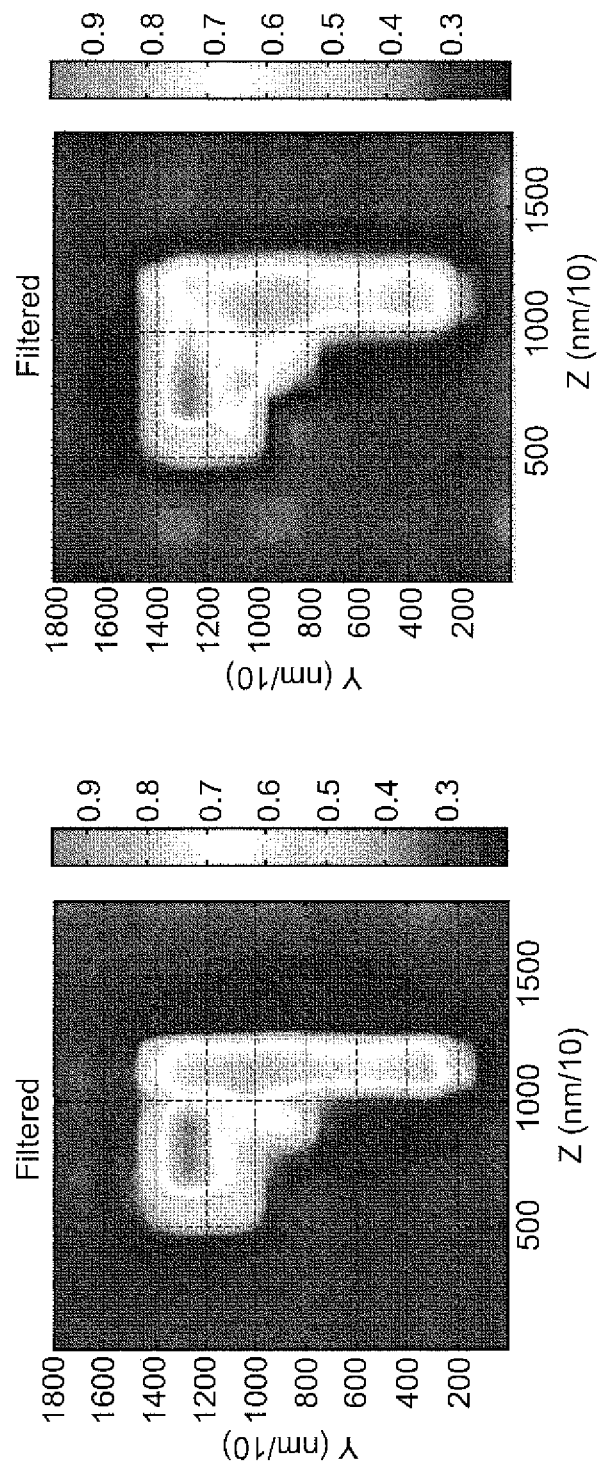
FIGS. 14A and 14B are images of a weapon, such as shown in FIGS. 12A and 12B, produced by a radar system using only one polarization, in accordance with an embodiment.

FIGS. 14A and 14B are images of a weapon, such as illustrated by FIGS. 12A and 12B, produced by a radar system using one polarization. FIG. 14A shows the image resulting from using 60 GHz scan frequency with vertical polarization. FIG. 14B shows the image resulting from using 60 GHz scan frequency with horizontal polarization.

Figure 15:
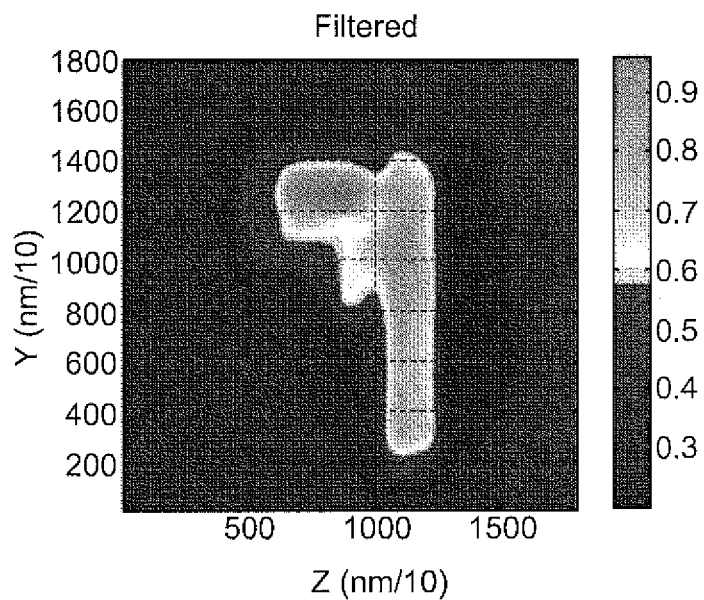
FIG. 15 is an image of a weapon, such as shown in FIGS. 12A and 12B, produced by a radar system using and combining imaging from two orthogonal polarizations, in accordance with an embodiment.

FIG. 15 is an image of a weapon, such as illustrated by FIGS. 12A and 12B, produced by a radar system using and combining imaging from two orthogonal polarizations, in accordance with an embodiment. FIG. 15 presents results of finite difference time domain (FDTD) simulating of the horizontal and vertical polarizations of the concealed gun. Due to the finer resolution limit of the 60 GHz (lambda, e.g., wavelength, of 5 mm) vs. 27.5 GHz (lambda of 12 mm) and the fact that transmit-receive technology of UWB permits use of 3 pico-second (pS) pulses, the images are superior at 60 GHz when impact of polarization was taken into account as shown in FIG. 15.

Figure 16B:
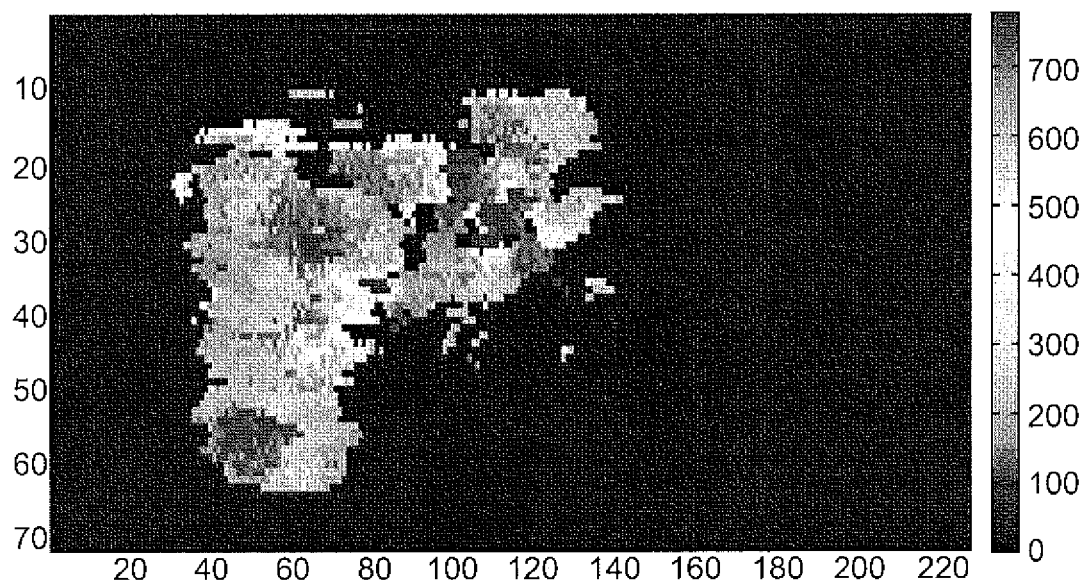
FIG. 16B is an image of a non-metallic weapon produced by a radar system using and combining imaging from two orthogonal polarizations, in accordance with an embodiment.
Figure 16A:
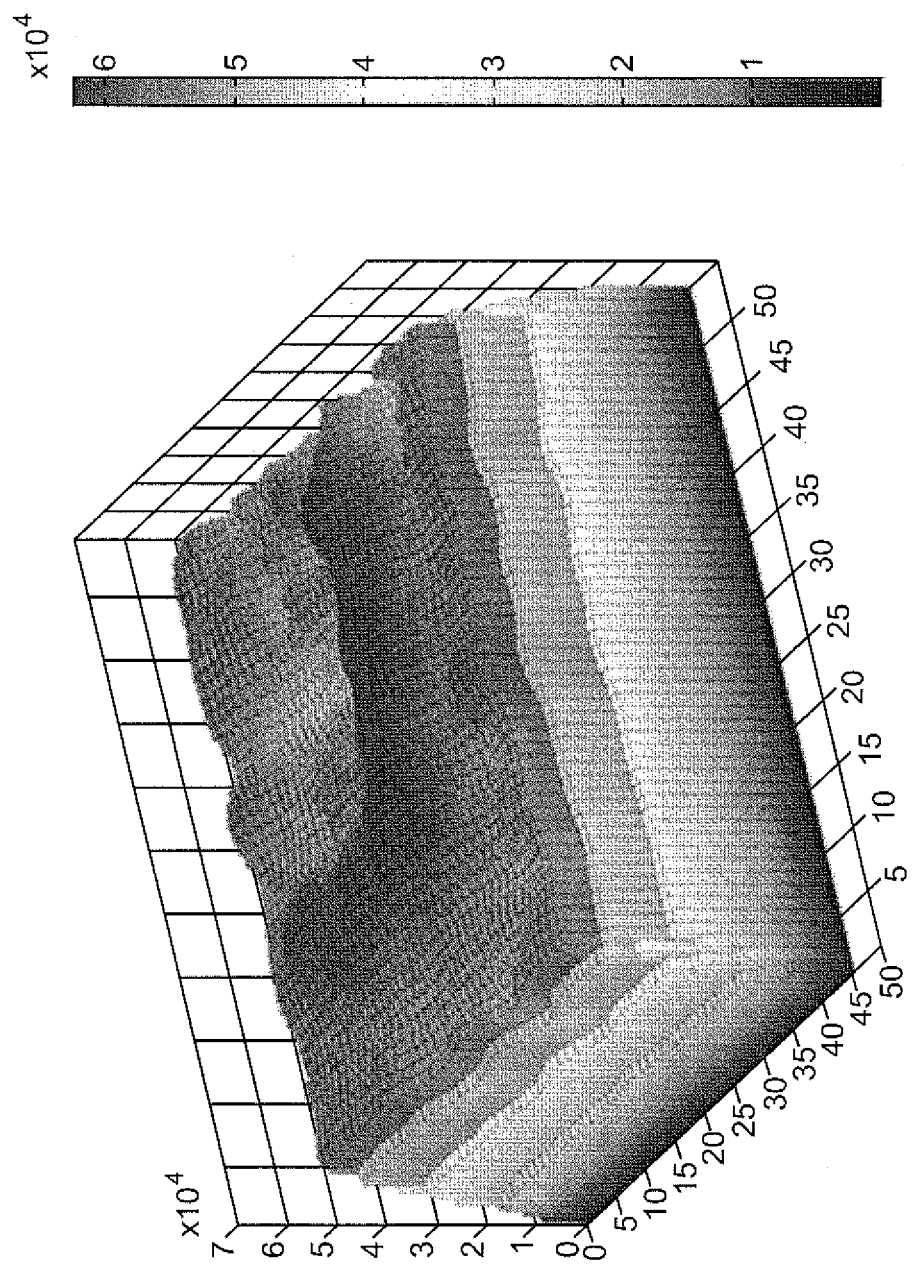
FIG. 16A is an image of a metallic weapon produced by a radar system using and combining imaging from two orthogonal polarizations, in accordance with an embodiment.

FIG. 16A is a three-dimensional (3-D) constructed image of a metallic weapon produced by a radar system (e.g., radar system 1300) using and combining imaging from two orthogonal polarizations (e.g., LHCP and RHCP). FIG. 16B is a 3-D image of a non-metallic (e.g., plastic) weapon produced by a radar system (e.g., radar system 1300) using and combining imaging from two orthogonal polarizations (e.g., LHCP and RHCP).

Embodiments described herein illustrate but do not limit the disclosure. It should also be understood that numerous modifications and variations are possible in accordance with the principles of the present disclosure. Accordingly, the scope of the disclosure is best defined only by the following claims.

What is claimed is:

1. A system comprising:
a first planar antenna array comprising a plurality of polarized antennas for a first polarization and
a second planar antenna array comprising a plurality of polarized antennas for a second polarization orthogonal to the first polarization and the second planar array is disposed over or under the first planar antenna array so that the first planar array and the second planar array are layered to form a wafer scale antenna module such that the wafer scale antenna module either transmits through the first planar antenna array and receives in the first planar antenna array as well as the second planar antenna array or transmits through the second planar antenna array and receives in the first planar antenna array as well as the second planar antenna array;
a feed network connecting a signal to each of the antennas;
a plurality of amplifiers dispersed in the feed network and configured to provide spatial power combining and beam forming of the signal; and
an image processor that combines processing from both first polarization reflected signals and second polarization reflected signals.

2. The system of claim 1, wherein:
the signal includes a transmitted signal and the amplifiers comprise power amplifiers.

3. The system of claim 1, wherein:
the signal includes a received signal and the amplifiers comprise low noise amplifiers.

4. The system of claim 1, wherein the system includes:
an image processor that combines processing from both first polarization reflected signals and second polarization reflected signals to provide image resolution enhanced over that provided by only the processing from the first polarization reflected signals or only the processing from the second polarization reflected signals.

5. The system of claim 1, wherein:
the planar antenna array has side dimensions less than 4.5 inches, placed on a substrate having diameter less than 6.0 inches;
side lobe suppression is at least 20 dB; and
cross polarization suppression is at least 20 dB.

6. The system of claim 1, wherein:
the first planar antenna array comprises a right-hand circularly polarized (RHCP) layer antenna array in a first planar surface wherein each antenna includes a spiral plate; and
the second planar antenna array comprises a left-hand circularly polarized (LHCP) layer antenna array in a second planar surface wherein each antenna includes a spiral plate.

7. The system of claim 1, wherein:
at least one of the transmitters and one of the receivers of the system operate at a carrier frequency of at least 8 GHz.

8. A radar system comprising:
a planar antenna array comprising a plurality of right-hand circularly polarized (RHCP) antennas and left-hand circularly polarized (LHCP) antennas in a planar surface;
a first feed network connecting a transmit signal to at least one of the antennas, including:
a plurality of power amplifiers dispersed in the first feed network and configured to provide spatial power combining and beam forming of the transmit signal; and
a second feed network connecting a first receive signal from at least one of the RHCP antennas and a second receive signal from at least one of the LHCP antennas, including:
a plurality of low noise amplifiers dispersed in the second feed network and configured to provide spatial power combining and beam forming of the first receive signal and spatial power combining and beam forming of the second receive signal; and
an image processor that combines processing from both the first receive signal and the second receive signal to provide image resolution enhanced over that provided by only the first receive signal processing or only the second receive signal processing.

9. The radar system of claim 8, wherein the system includes:
a high gain antenna array, with side dimensions less than 4.5 inches, placed on a substrate having diameter less than 6.0 inches, wherein cross polarization suppression is at least 20 dB.

10. The radar system of claim 8, wherein the system includes:
an antenna array comprising alternating right-hand circularly polarized (RHCP) and left-hand circularly polarized (LHCP) four-by-four antenna arrays in a planar surface.

11. The radar system of claim 8, wherein:
at least one of the transmitters and one of the receivers of the system operate at a carrier frequency of at least 8 GHz.

12. A method comprising:
transmitting a first signal having a first polarization or a second signal having a second polarization different from the first polarization using a planar antenna array comprising a plurality of right-hand circularly polarized (RHCP) antennas and left-hand circularly polarized (LHCP) antennas in a planar surface and a first feed network connecting the first signal to at least one of the antennas or the second signal to at least one of the antennas, wherein the first feed network comprises a plurality of power amplifiers dispersed in the first feed network and configured to provide spatial power combining and beam forming of the first signal and the second signal;
receiving a first reflected signal from at least one of the plurality of RHCP antennas and a second reflected signal from at least one of the plurality of LHCP antennas using the planar antenna array and a second feed network connecting the received first reflected signal and the received second reflected signal, wherein the second feed network comprises a plurality of low noise amplifiers dispersed in the second feed network and configured to provide spatial power combining and beam forming of the received first reflected signal and to provide spatial power combining and beam forming of the received second reflected signal;
performing a first image processing using the received first reflected signal;

performing a second image processing using the received second reflected signal;

combining the first and second image processing to provide image resolution enhanced over that provided by only the first image processing or only the second image processing.

13. The method of claim 12, wherein transmitting the first signal having a first polarization includes feeding the signal to an antenna element having a spiral plate.

14. The method of claim 12, further comprising:

displaying an image from the combined image processing from both the first reflected signal and the second reflected signal, wherein the first reflected signal has polarization orthogonal from that of the second reflected signal.

15. The method of claim 12, further comprising:

performing spatial power combining and beam forming of the transmitted first signal and the transmitted second signal via the plurality of power amplifiers dispersed in the first feed network.

16. The method of claim 12, further comprising:

performing spatial power combining and beam forming of the received first reflected signal and the received second reflected signal via the plurality of low noise amplifiers dispersed in the second feed network.

17. The method of claim 12, further comprising:

performing spatial power combining and beam forming from the planar antenna array, wherein the planar antenna array comprises a high gain planar antenna array, with side dimensions less than 4.5 inches, placed on a substrate having diameter less than 6.0 inches, wherein side lobe suppression is at least 20 dB.

18. The method of claim 12, further comprising:

performing spatial power combining and beam forming from the planar antenna array, wherein the planar antenna array comprises alternating right-hand circularly polarized (RHCP) and left-hand circularly polarized (LHCP) four-by-four antenna arrays in a planar surface.

19. The method of claim 12, further comprising:

transmitting the first signal and the second signal and receiving the first reflected signal and the second reflected signal at a carrier frequency of at least 8 GHz.

* * * * *

UNITED STATES PATENT AND TRADEMARK OFFICE
CERTIFICATE OF CORRECTION

PATENT NO. : 9,244,163 B2
APPLICATION NO. : 13/755947
DATED : January 26, 2016
INVENTOR(S) : Farrokh Mohamadi Page 1 of 1

It is certified that error appears in the above-identified patent and that said Letters Patent is hereby corrected as shown below:

In the Specification

In Column 7, Line 46, change "FIG. 1013" to --FIG. 10B--.

In Column 8, Line 17, change "Badwidth" to --Bandwidth--.

In Column 8, Line 20, change "Supression" to --Suppression--.

Signed and Sealed this
Nineteenth Day of July, 2016

Michelle K. Lee
*Director of the United States Patent and Trademark Office*